No. 818,508. PATENTED APR. 24, 1906.
A. H. WOODWARD.
FARE REGISTER.
APPLICATION FILED SEPT. 27, 1901.

10 SHEETS—SHEET 1.

Witnesses,
Edward T. Wray
Homer L. Kraft

Inventor,
Arthur H. Woodward
by Parker & Carter
Attorneys.

No. 818,508. PATENTED APR. 24, 1906.
A. H. WOODWARD.
FARE REGISTER.
APPLICATION FILED SEPT. 27, 1901.

10 SHEETS—SHEET 2.

Witnesses.
Edward T. Wray.
Homer L. Kraft.

Inventor.
Arthur H. Woodward.
by Parker & Carter,
Attorneys.

No. 818,508. PATENTED APR. 24, 1906.
A. H. WOODWARD.
FARE REGISTER.
APPLICATION FILED SEPT. 27, 1901.

10 SHEETS—SHEET 3.

Witnesses.
Edward T. Wray.
Homer L. Kraft.

Inventor.
Arthur H. Woodward.
by Parker & Carter.
Attorney's.

No. 818,508. PATENTED APR. 24, 1906.
A. H. WOODWARD.
FARE REGISTER.
APPLICATION FILED SEPT. 27, 1901.

10 SHEETS—SHEET 4.

Witnesses.
Edward T. Wray
Homer L. Kraft

Inventor
Arthur H. Woodward
by Parker & Carter
Attorneys.

No. 818,508. PATENTED APR. 24, 1906.
A. H. WOODWARD.
FARE REGISTER.
APPLICATION FILED SEPT. 27, 1901.
10 SHEETS—SHEET 5.
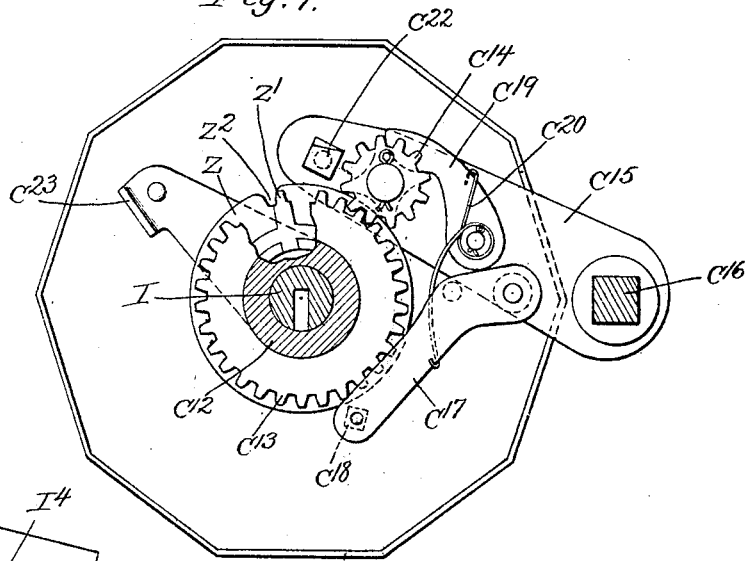
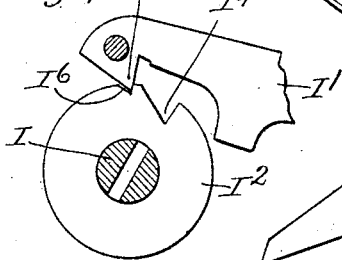
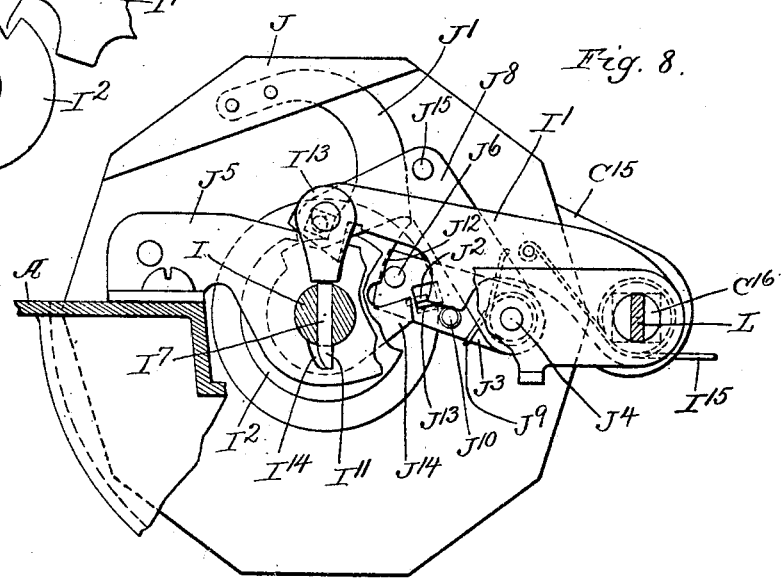
Witnesses.
Edward T. Wray.
Homer L. Kraft.
Inventor.
Arthur H. Woodward
by Parker & Carter
Attorney's

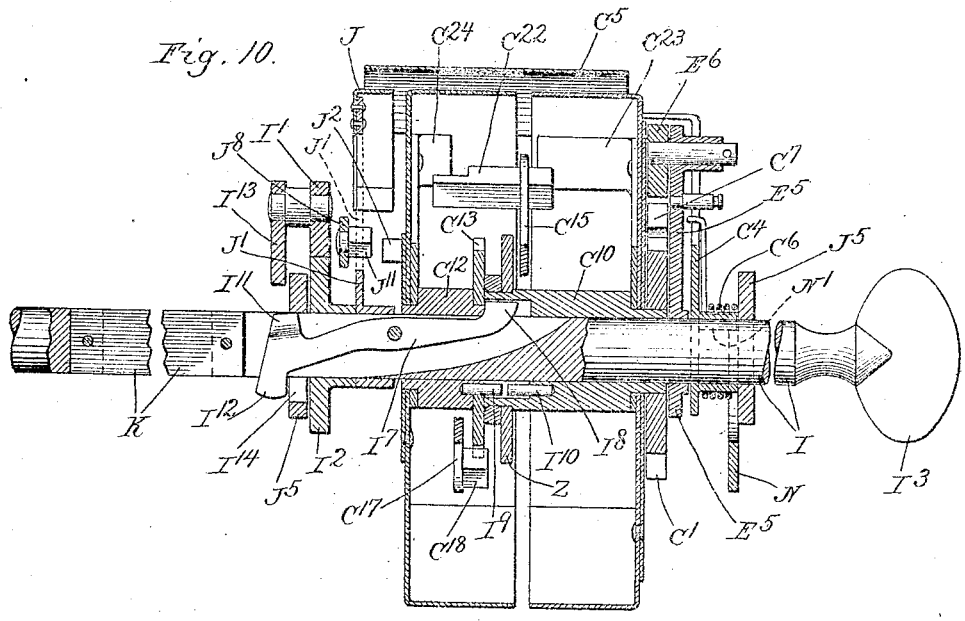

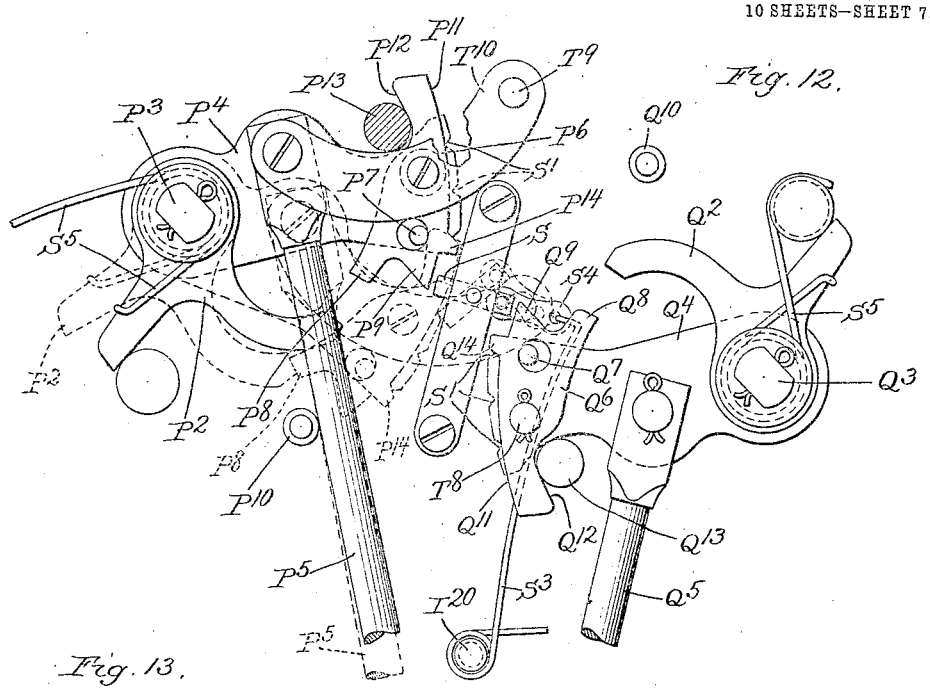

No. 818,508. PATENTED APR. 24, 1906.
A. H. WOODWARD.
FARE REGISTER.
APPLICATION FILED SEPT. 27, 1901.

10 SHEETS—SHEET 8.

Witnesses,
Edward T. Wray.
Homer P. Kraft

Inventor.
Arthur H. Woodward
by Parker & Carter
Attorneys.

No. 818,508. PATENTED APR. 24, 1906.
A. H. WOODWARD.
FARE REGISTER.
APPLICATION FILED SEPT. 27, 1901.

10 SHEETS—SHEET 9.

No. 818,508. PATENTED APR. 24, 1906.
A. H. WOODWARD.
FARE REGISTER.
APPLICATION FILED SEPT. 27, 1901.
10 SHEETS—SHEET 10.
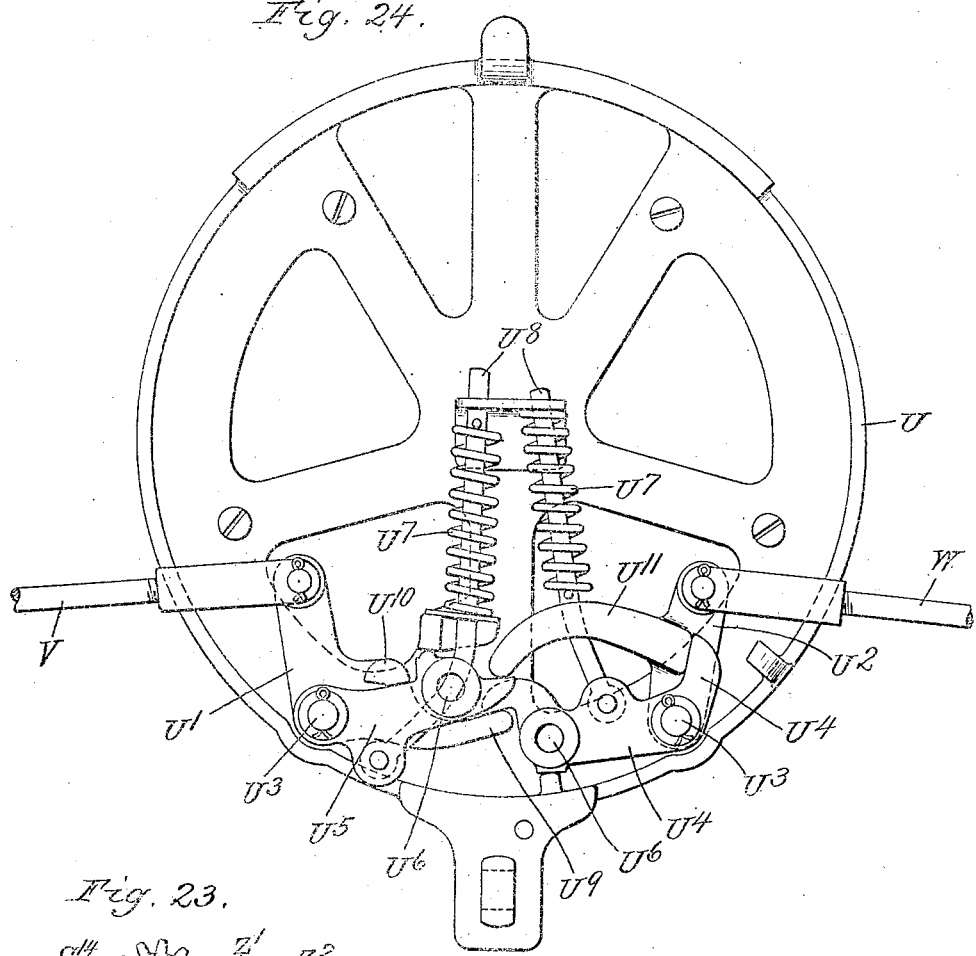
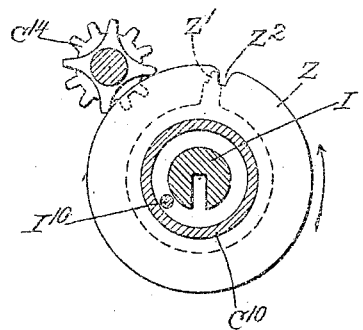
Witnesses.
Edward T. Wray.
Homer L. Krafft.
Inventor.
Arthur H. Woodward
by Parker & Carter
Attorneys.

UNITED STATES PATENT OFFICE.

ARTHUR H. WOODWARD, OF CHICAGO, ILLINOIS, ASSIGNOR TO THE INTERNATIONAL REGISTER COMPANY, OF CHICAGO, ILLINOIS, A CORPORATION OF ILLINOIS.

FARE-REGISTER.

No. 818,508.     Specification of Letters Patent.     Patented April 24, 1906.

Application filed September 27, 1901. Serial No. 76,746.

*To all whom it may concern:*

Be it known that I, ARTHUR H. WOODWARD, a citizen of the United States, residing in Chicago, in the county of Cook and State of Illinois, have invented a certain new and useful Improvement in Fare-Registers, of which the following is a specification.

My invention relates to fare-registers, and has for its object to provide a new and improved fare-register of which the following is a description, reference being had to the accompanying drawings, wherein—

Figure 1:
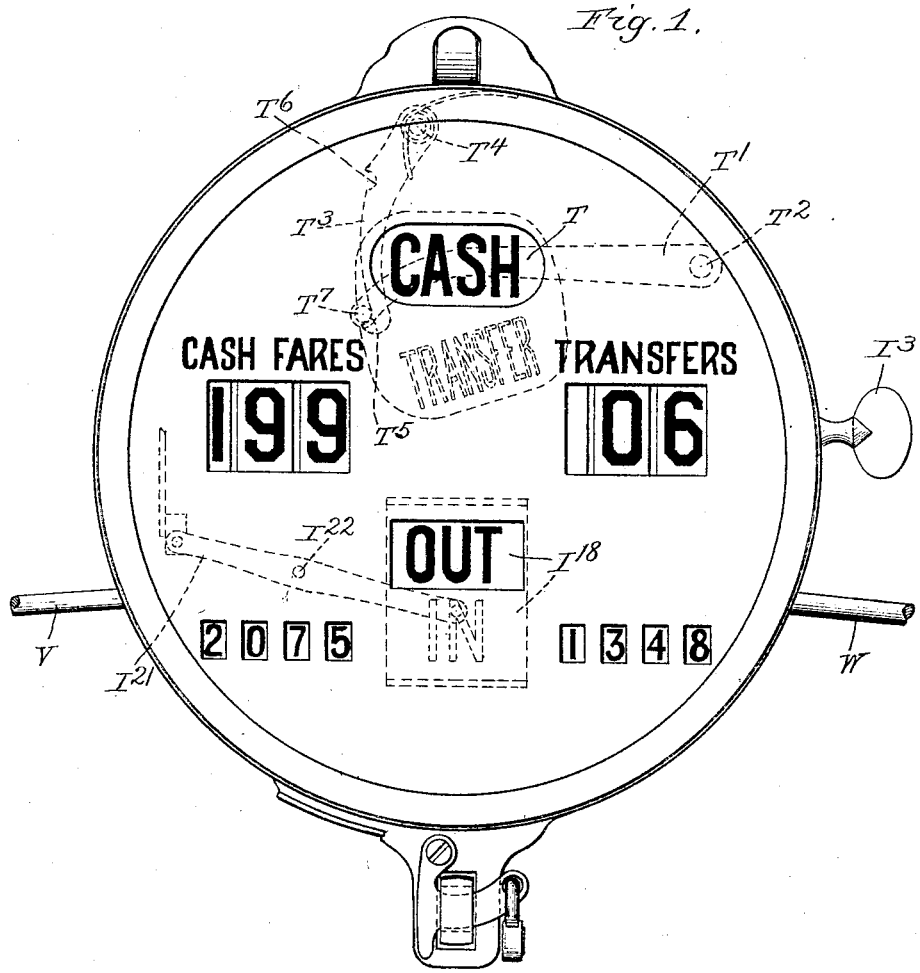
Figure 22:
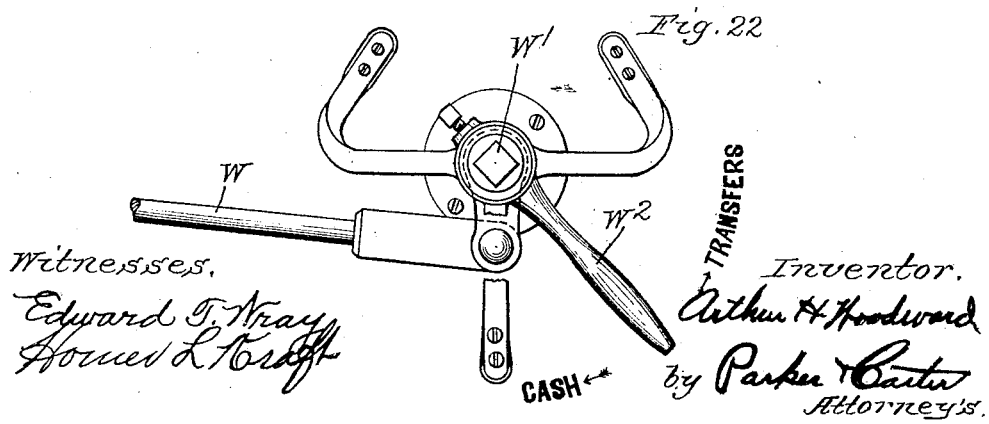
Figure 2:
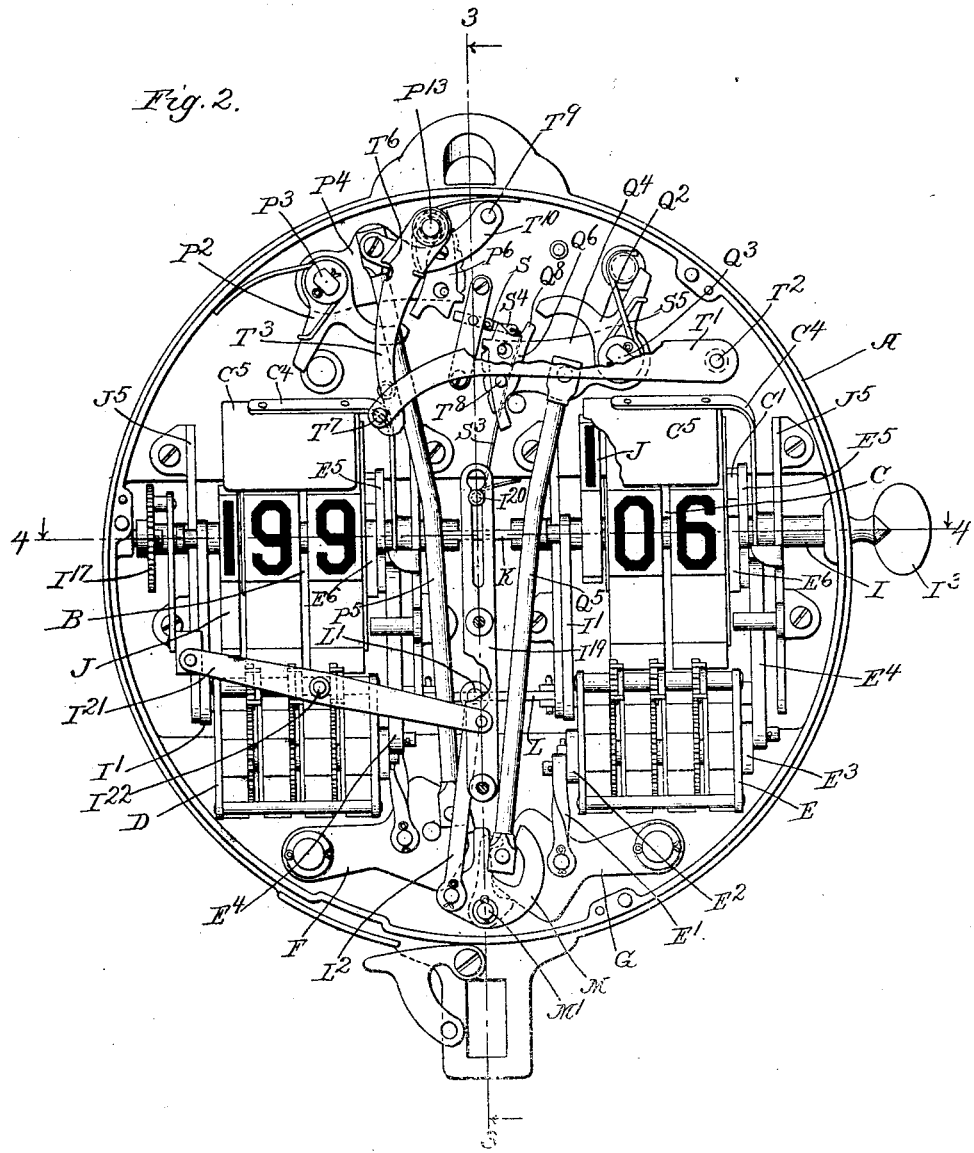
Figure 3:
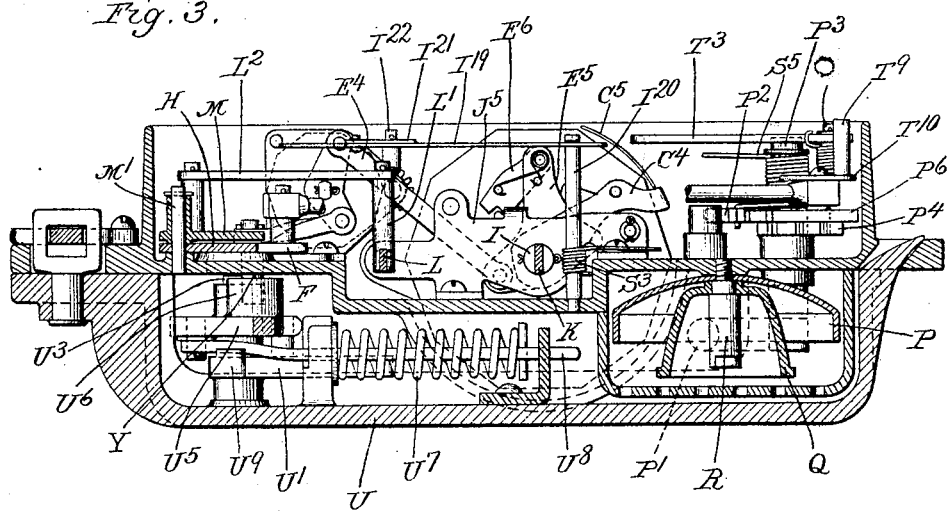
Figure 4:
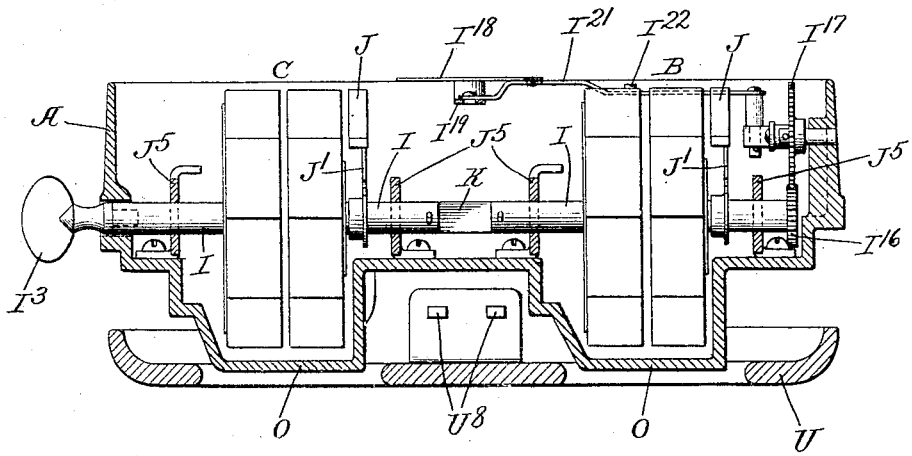
Figure 5:
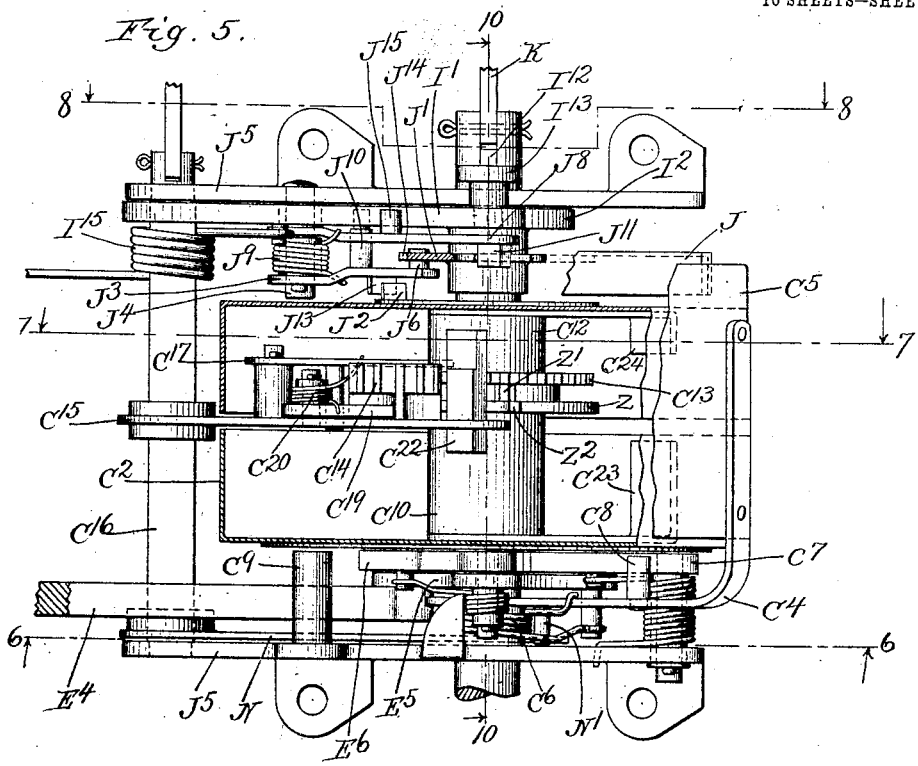
Figure 6:
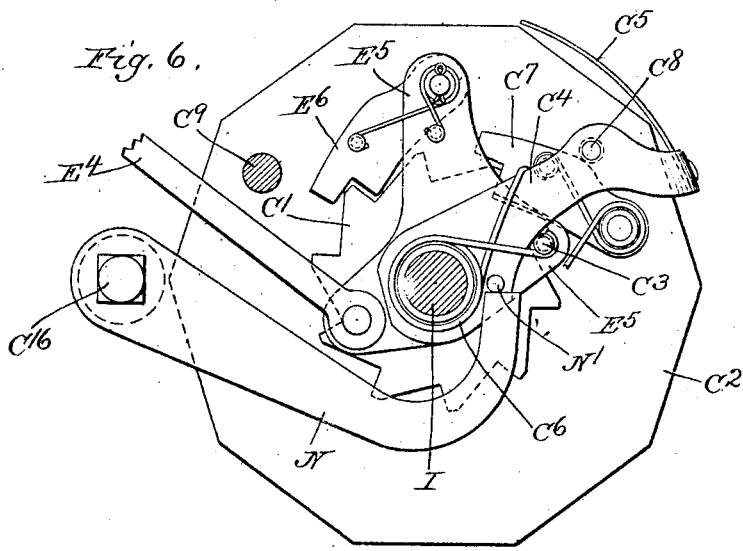
Figure 18:
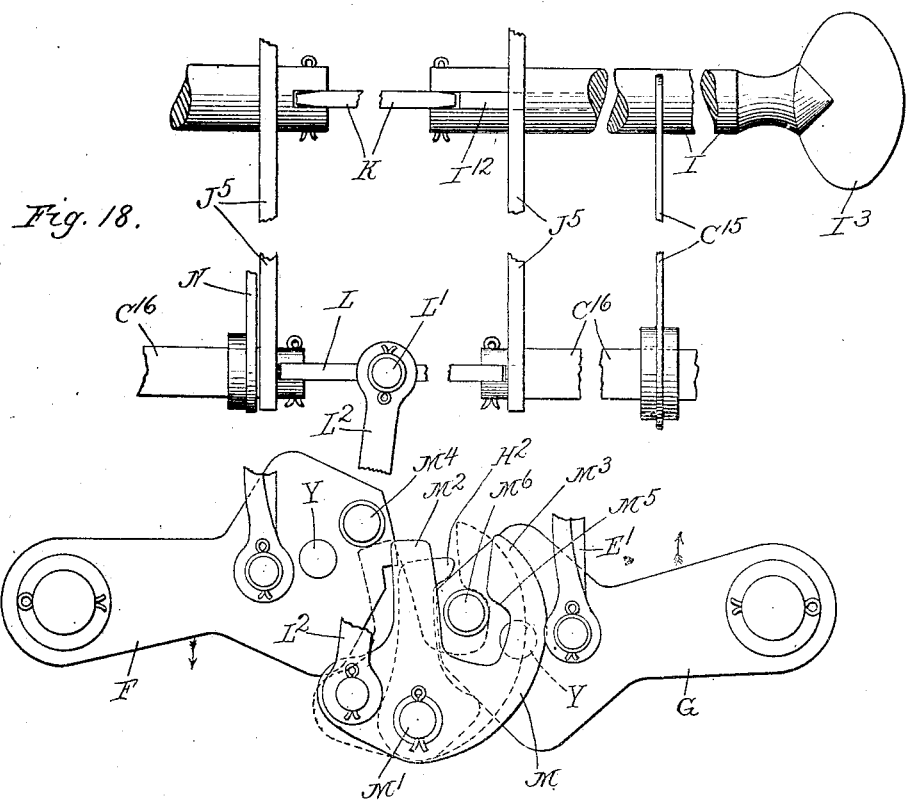
Figure 19:
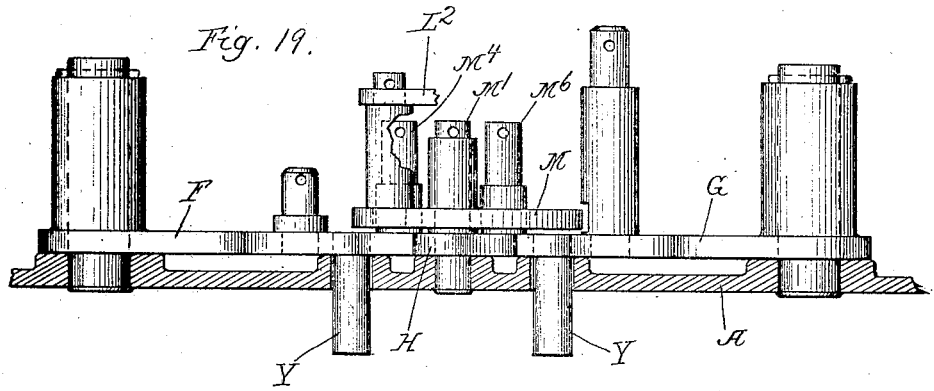
Figure 20:
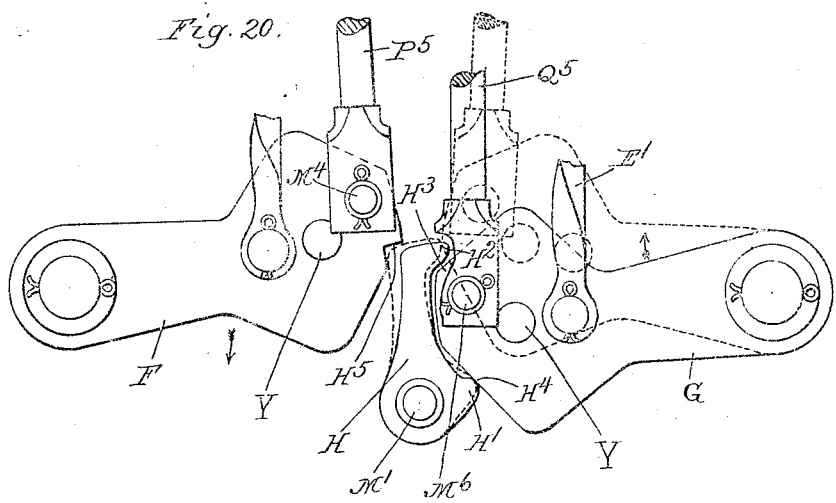
Figure 21:
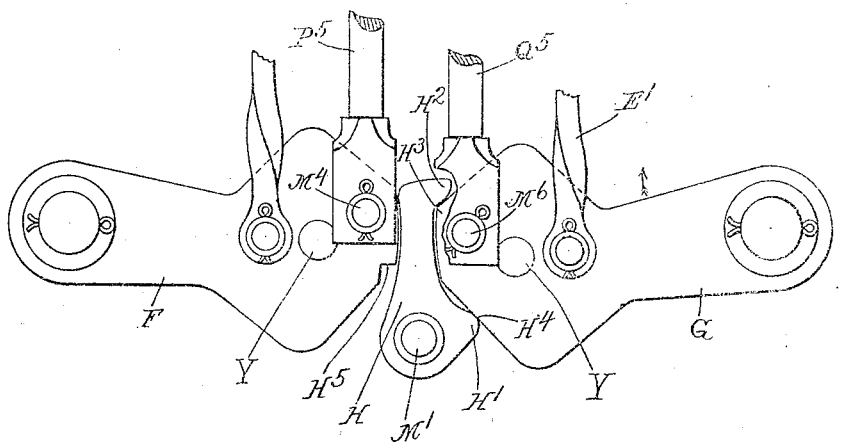

Figure 1 is a plan view of the register embodied in my invention. Fig. 2 is a view similar to Fig. 1 with the dial of the register removed. Fig. 3 is a section on line 3 3, Fig. 2. Fig. 4 is a section on line 4 4, Fig. 2. Fig. 5 is a plan view of one of the trip-registers with parts broken away. Fig. 6 is a section on line 6 6, Fig. 5. Fig. 7 is a section on line 7 7, Fig. 5. Fig. 8 is a section on line 8 8, Fig. 5. Fig. 9 is a view of the cam on the resetting-shaft and its associated lever. Fig. 10 is a section on line 10 10, Fig. 5. Fig. 11 is a view similar to Fig. 10, showing the parts in a different position. Fig. 12 is a view of the bell-operating mechanism. Fig. 13 is a view of the safety-dog, located between the two bell-operating mechanisms. Fig. 14 is a side view of said dog apart from the mechanism. Fig. 15 is a view of Fig. 14 as seen from below. Fig. 16 is a view of the bell-operating mechanism, showing the parts when the bell-hammer has been released. Fig. 17 is a view similar to Fig. 16 just prior to the release of the bell-hammer. Fig. 18 is a view showing the operating-levers and the interlocking mechanism associated therewith. Fig. 19 is a side elevation of Fig. 18. Figs. 20 and 21 are views of the operating-levers and interlocking mechanism therefor, showing different positions of the parts. Fig. 22 is a view of one of the handles located at a distant point of the car for operating the register. Fig. 23 is a view, with parts broken away, showing the connection between the units and tens wheel. Fig. 24 is a view of the register-back.

Like letters refer to like parts throughout the several figures.

I have illustrated my invention in connection with fare-registers adapted to register two classes of fares. The register mechanism proper is contained within the case A, provided with a suitable cover and adapted to be connected to a removable back. Within the case A are provided the two trip-registers B and C and the two permanent registers D and E. Two operating-levers F and G are pivotally connected to the register-case and are provided with projecting pins or parts Y, which project beyond the register-case and which are actuated by the mechanism associated with the removable back. These operating-levers are connected with the mechanism of the register, so as to operate such mechanism when moved. As illustrated in the drawings, the trip-register B and the permanent register D and associated parts form one mechanism for registering one kind of fares and the trip-register C and permanent register E and associated parts form another mechanism for registering a different class of fares. By means of the mechanism associated with the back of the register either of these register mechanisms can be operated from any given point in the car. I provide means associated with the operating-levers for preventing them from being operated simultaneously. One form of construction for this purpose is illustrated in Figs. 20 and 21. The levers F and G are adapted to move in opposite directions, as indicated by the arrows. Between these two levers is a pivotal holding-piece H, provided with the projections H' and H². The projection H² is adapted under certain conditions to engage the face H³ of the lever G. The projection H' is adapted to engage the face H⁴ of said lever. The lever F is provided with a notch or is otherwise formed so as to have an engaging part H⁵. The lever G when in its normal position engages the projection H', so as to hold the part H in the position shown in full lines of Fig. 20. This leaves the lever F free to move, but when moved it holds the holding-piece H, so that the projection H² engages the lever G and locks it against movement. This position is shown in Fig. 21. If, on the other hand, the lever G is moved first, the engagement of the face H² with the projection H³ moves the holding-piece aside and into the position shown in dotted lines in Fig. 20. This leaves the lever G free to complete its movement; but the holding-piece engages the part H⁵ of lever F and locks said lever against movement. It will, therefore, be seen that either of these levers can be moved alone and that when the operator starts to move one lever the other lever is thereby locked, thus necessitating a complete movement of the first lever before the parts will return to their normal position. It will further be seen that this result is accomplished without the use of springs or the like.

As the two mechanisms of the register are substantially duplicates, I will only describe in detail one of these mechanisms, the corresponding parts of the other mechanism being properly lettered, so as to facilitate the explanation of the operation.

The permanent register E is connected with the operating-lever G by means of the rod E' and the crank $E^2$. This permanent register may be made up in any desired form and usually consists of a series of wheels having numbers on their periphery and mounted upon a shaft. These wheels represent units, tens, hundreds, &c., and are connected together, so that at every complete rotation of a given wheel the adjacent wheel on the left is moved one number. The numbers are exposed through a dial, as shown in Fig. 1, so that the register can be easily read. The shaft of the permanent register E is provided at the other end with the crank $E^3$, to which is connected the rod $E^4$.

As illustrated in Fig. 6, the rod $E^4$ is connected with the movable piece $E^5$, mounted upon the trip-register shaft. This piece $E^5$ is provided with an actuating-pawl $E^6$, which engages a ratchet C', associated with the units numeral-wheel $C^2$ of the trip-register. This pawl is provided with a suitable holding-spring, as shown. Mounted upon the trip-register shaft I is an arm $C^4$, carrying a blind $C^5$. The dial of the register is provided with an opening, through which the figures of the trip-register show, as indicated in Fig. 1, the trip-register C being the one indicating transfers in Fig. 1. This blind is moved up over the opening in the register-dial each time the trip-register is operated, so as to conceal the figures during the operation, the blind being moved back again after the fare has been registered. This blind is provided with a retracting-spring $C^6$, which normally holds it in its inoperative position. The spring $C^6$ is connected at one end with the blind-arm and at the other end with the movable piece $E^5$. During the ordinary operation of the register the piece $E^5$ and the blind and its arm move together, and hence the spring during this operation is substantially inoperative, there being no work done by it. As will be hereinafter noted, when the register is reset the dial is moved up independent of the piece $E^5$, and the spring then works to move it back to its normal position. It will be seen that by attaching the end of the spring $C^6$ to the movable piece $E^5$ instead of a stationary part the work on the spring is very materially reduced, for the register is operated in the ordinary way a large number of times for every time it is reset. This movable piece $E^5$ is provided with the projection $C^3$, which engages the blind-arm $C^4$ when the rod $E^4$ is moved, so as to actuate the register, thus moving the blind, so as to cover the figures exposed through the dial. A holding-pawl $C^7$ is associated with the ratchet-wheel C', so as to prevent it from being moved backward. This pawl is held so that it cannot be disengaged from the teeth of the ratchet-wheel by the pin or projection $C^8$, carried by the blind-lever $C^4$. When the trip-register is at rest and in its initial position, the pin $C^8$ engages the holding-pawl $C^7$, thus forcing it toward the ratchet-wheel and, as it were, locking the trip-register against movement. When the trip-register is operated, the blind and its arm, together with the pin $C^8$, are moved, and said pin $C^8$ follows the outline of the holding-pawl $C^7$, thereby preventing the too rapid movement of the units-wheel of the trip-register. During this position the pawl $E^6$ is held in place by the pin $C^9$, connected with the holding-frame of the trip-register. (See Fig. 5.)

The units-wheel $C^2$ of the trip-register is provided with a suitable hub or central part $C^{10}$, surrounding the shaft I. The tens-wheel $C^{11}$ is provided with a gear-wheel $C^{13}$, which engages a pinion $C^{14}$. (See Fig. 7.) This pinion is carried by the arm $C^{15}$, connected with the shaft $C^{16}$, which in this case is shown as square, which is mounted in the frame of the trip-register. Mounted on the central part $C^{10}$ of the units-wheel is a disk Z, and associated with this disk is a projection Z'. The pinion $C^{14}$ is formed at one side with four teeth, the remaining teeth being cut away, and this disk fits in between two of these four teeth, so as to lock this pinion (see Fig. 23) during the ordinary movement of the units-wheel. When the projection Z' engages one of the actuating-teeth on the pinion, so as to rotate the pinion, in this instance one-fourth of a revolution, the notch $Z^2$ comes opposite one of the four teeth on the pinion and permits the pinion to be turned, the disk again locking the pinion after the notch has passed. It will thus be seen that the function of the notch is, as it were, to unlock the pinion once during every revolution of the units-wheel. Since the pinion is connected with the tens-wheel by the gear $C^{13}$, the rotation of the pinion rotates the tens-wheel. It will therefore be seen that by means of this mechanism the tens-wheel is rotated one figure for every complete revolution of the units-wheel.

The shaft $C^{16}$ is associated with the resetting mechanism and is adapted to be moved when the register is being reset, so as to disengage the pinion $C^{14}$ from the gear $C^{13}$. Connected with this arm $C^{15}$ is another movable arm $C^{17}$, provided with a projection $C^{18}$, adapted to engage the teeth of the gear $C^{13}$ when the arm $C^{15}$ is lifted to disengage the pinion $C^{14}$. The pinion $C^{14}$ is provided with the holding-pawl $C^{19}$ and the spring $C^{20}$, which also engages the stop-arm $C^{17}$. The arm $C^{15}$ is also provided with an engaging part $C^{22}$, which when raised to disengage the pinion $C^{14}$ from the gear $C^{13}$ engages the pieces $C^{23}$ and $C^{24}$, connected with the numeral-wheels, so as to limit their rotation. These pieces are connected, so as to engage the engaging part $C^{22}$ when the figure "0" is exposed through the opening in the dial. This arm $C^{15}$ is lifted by the cam-lever $I'$, rigidly connected with the shaft $C^{16}$. This cam-lever engages an irregular wheel, disk, or cam $I^2$, connected to the shaft $I$, which may be termed the "resetting-shaft," the shaft being provided with the thumb-piece $I^3$, by means of which it can be turned. The cam $I^2$ is provided with the deep notch $I^4$, in which the point $I^5$ of the lever $I'$ normally drops. Said cam is provided with another notch $I^6$, preferably shallow, which prevents the parts from being turned backward when the resetting operation is once begun. The trip-register is also provided with a wing or piece $J$, provided with one or more figures and adapted to be moved up so as to indicate "hundreds" through the opening in the dial. This hundreds-wing is connected to the arm $J'$, mounted upon the resetting-shaft. The tens-wheel is provided with the projection $J^2$, which engages a projection on the arm $J^3$, mounted on the pin $J^4$, connected with the frame $J^5$ of the trip-register. This arm $J^3$ is provided with a projection $J^6$, which engages a projection $J^{14}$ on the arm of the hundreds-wing. It will therefore be seen that when the tens-wheel is given a complete revolution the projection $J^2$ will move the arm $J^3$, so as to throw the hundreds-wing up in position. The arm of the hundreds-wing is provided with a holding-piece $J^8$, which has a suitable retracting-spring $J^9$. This holding-piece is provided with the projection $J^{11}$, which engages a notch in the arm of the hundreds-wing when moved in position, so as to hold it in such position. During the resetting process this holding-piece is lifted when the cam-lever rides upon the periphery of the cam, so as to release the hundreds-wing, and it is retracted by the spring $J^9$, lifting the arm $J^3$, the projection $J^6$ in this position engaging the arm of the hundreds-wing, so as to throw it back. The retracting-spring $J^9$, it will be noted, is connected at one end to the arm $J^3$ and at the other end to the holding piece or dog $J^8$. This spring therefore tends to move said two pieces in opposite directions. This motion is limited in one direction by the pin $J^{10}$, which passes beneath the holding-dog $J^8$ and engages the cam-lever $I'$. (See Figs. 5 and 8.) As shown in Fig. 8, the projection $J^6$ on the arm $J^3$ engages the curved face $J^{12}$ on the arm $J'$ when the hundreds-wing is not in use, thus locking it against accidental movement. It will be seen that this prevents the hundreds-wing from being moved to its operative position by the resetting of the register or by any other cause except the normal cause, due to the action of the tens-wheel. The face $J^{12}$ is preferably the arc of a circle, so as to permit the pin to move freely therealong. When the projection on the tens-wheel strikes the projection $J^{13}$ on the arm $J^3$, the projection $J^6$ is moved down, so as to engage the part $J^{14}$ on the wing-arm, thus moving said wing out to its operative position. The wing is held in this position by the projection $J^{11}$ on the end of the holding-dog $J^8$. In the process of resetting the cam-lever $I'$ engages the pin $J^{15}$ on the holding-dog and lifts said holding-dog, so as to remove the projection $J^{11}$ from the notch on the wing-arm, thus releasing the arm. The arm is then thrown back by the spring $J^9$, as hereinbefore stated. It will thus be seen that the hundreds-wing is reset during the early part of the resetting process. Some means must therefore be provided for preventing the hundreds-wing from being brought to its operative position during the resetting of the tens-wheel. I produce this result by lifting the arm $J^3$ up, so that the projection $J^{13}$ will be out of the way of the projection $J^2$ on the tens-wheel. This is done during the first part of the resetting process by the pin $J^{10}$ engaging the cam-lever $I'$. As this cam-lever is lifted the arm $J^3$ is lifted with it, because of the connection of the two by the spring $J^9$. It will be seen that this actuating projection $J^{13}$ is held out of the way throughout the resetting process, and when the projection on the end of the cam-lever drops into the notch on the cam the engagement of the cam-lever with the pin $J^{10}$ moves the arm $J^3$ and the holding-dog back to their normal position, this latter movement being the final movement of resetting.

The resetting-shaft $I$ is preferably formed or hollowed, so as to receive the resetting-lever $I^7$. (See Fig. 10.) This lever is provided with a projecting end $I^8$, adapted to be projected through an opening in the shaft and when so projected to engage the projections $I^9$ and $I^{10}$, connected with the units and tens wheels. The resetting-lever is provided at the other end with a projection $I^{11}$ and is also preferably provided with the projection $I^{12}$. The cam-lever $I'$ has attached to it a holding-piece $I^{13}$, adapted to engage the projection $I^{12}$ of the resetting-lever when the end of the cam-lever is in the notch $I^4$, thus forcing the projection $I^{11}$ outwardly, so as to be exposed beyond the face of the shaft. This projection $I^{11}$ when projected beyond the outer surface of the shaft is received into an opening $I^{14}$ in the frame of the trip-register. (See Fig. 8.) This projection is preferably beveled, as indicated in said figure, and the opening is somewhat larger than the projection and may also be beveled. If now the shaft is turned in the right direction to reset the mechanism, the beveled face of the projection engaging the opposed face of the frame is moved upwardly, so as to project the end $I^8$ beyond the face of the shaft, so as to engage the projections $I^9$ and $I^{10}$. It will thus be seen that when the end of the lever $I^7$ is in engagement with said projections and the shaft is turned the numeral-wheels will be rotated. When the wheels are moved to zero, the projections $C^{23}$ and $C^{24}$ engage the engaging part $C^{22}$, so as to stop the wheels and at the same time the cam-lever comes opposite the notch $I^4$ in the cam and drops down into said notch, the piece $I^{13}$ engaging the projection $I^{12}$ on the resetting-lever, so as to force it downwardly and retract the end $I^8$ within the shaft. This movement is aided by the spring $I^{15}$.

When either of the numeral-wheels are at zero, they of course do not need to be moved, and I provide means for avoiding moving them during the resetting process. This result is obtained by making the opening $I^{14}$ somewhat larger than the projection $I^{11}$. By this means the resetting-shaft may be moved slightly before the projection $I^8$ is forced beyond the face of the shaft. When the numeral-wheels are at zero, the projections $I^9$ and $I^{10}$ are in such a position that this slight movement of the shaft permits the projection $I^8$ to pass them, and hence it will not engage them. The parts, however, are arranged so that if the numeral-wheels are in any other position they are engaged and brought back to zero.

The resetting-shaft passes through both trip-registers and is provided at its end with a pinion $I^{16}$, (see Fig. 4,) which engages a gear $I^{17}$, (see Fig. 2,) which operates the indicating device $I^{18}$, (see Fig. 1,) which indicates the direction of the trip. This indicating device is connected with a slotted arm $I^{19}$, which is confined by a pin $I^{20}$. A lever $I^{21}$ is mounted on the post $I^{22}$ and is connected with said indicating device, said lever being operatively connected with the gear $I^{17}$, so as to be alternately rocked about the post $I^{22}$ to slide the indicating device back and forth and expose different words through the opening in the dial. The resetting-shaft is preferably made in two parts, so as to aid in assembling, the two parts being connected together by the connecting-piece K. This connecting-piece K is slightly beveled at the sides where it engages the resetting-shaft, thus permitting the two parts of the shaft to be slightly out of alinement without producing any lost torsional motion. The shaft $C^{16}$ also extends through both trip-registers and is preferably a divided shaft, being connected by the connecting-piece L, which is beveled in a similar manner to the connecting-piece K. Attached to this connecting-piece L is a standard L', which is connected, by means of the piece $L^2$, with the resetting-lock M for the operating-levers G and F. (See Fig. 18.) This resetting-lock is pivotally mounted upon a pin M', connected to the base of the register-case, and is provided with two arms $M^2$ $M^3$. The piece $L^2$ is connected to the resetting-lock at one side of its pivotal point, and, as the shaft $C^{16}$ is oscillated by the movement of the cam-lever from the deep notch in the cam $I^2$ said piece rocks the resetting-lock at its pivotal point, so as to bring the arm $M^2$ in front of the post $M^4$, connected with the lever F, and so as to bring the projecting face $M^5$ of the part $M^3$ in front of the post $M^6$ on the lever G, as shown in dotted lines in Fig. 18. It will therefore be seen that when in this position it is impossible to move either of these levers, and the register mechanism is locked until the resetting operation has been completed. This resetting-lock also acts to prevent the resetting mechanism from being operated except when the register mechanism is in its normal or initial position. If, for example, either of the levers F and G are moved from their initial position and left at some intermediate position, the pins $M^4$ and $M^6$ will engage the sides of the arms $M^2$ and $M^3$, and thus prevent the resetting-lock M from being moved. As said resetting-lock is connected with the resetting-shaft, it will be seen that under such conditions it is impossible to move the resetting-shaft to reset the trip-registers. When the register mechanism is in its initial position, the arms are free from the pins, as hereinbefore explained, and the resetting-lock is free to be moved. When the shaft $C^{16}$ is rocked or tilted by the cam-lever moving out of the cam-slot in the periphery of the cam $I^2$, the curved or bent arms N, associated with each register mechanism, engage the pins N' on the blind-arms, and said blinds are moved during the resetting process so as to move the pin $C^3$ and release said pin and the pawl $C^7$, thus permitting the units-wheel to be rotated by the resetting-shaft. The blinds are moved up during the resetting process, so as to conceal the figures of the trip-register exposed through the dial.

As indicated in Fig. 1, the two trip-registers are arranged to indicate cash-fares and transfers, although, of course, it is evident that they could indicate any other kind of fares desired. I provide two different bells, having different tones, one adapted to be rung when one class of fares is registered and the other adapted to be rung when the other class of fares is registered. In the construction illustrated in the drawings I place these bells outside of the register-case proper, providing an exterior chamber inclosed by the exterior bell-casing O, attached to the main register-case by screws, which are inserted from the inside, so that they cannot be tampered with except by taking off the top of the register-case.

The bells P and Q, as herein shown, are mounted one within the other to economize space, the inner bell Q being loosely mounted upon the support R. The bell-hammers P' and Q' are located in the bell-casing and are provided with the hammer-arms $P^2$ and $Q^2$, which are contained within the casing and which may be integral with the bell-hammers or connected thereto in any other desired manner. These hammer-arms are connected to the posts $P^3$ and $Q^3$ and may be integral with said posts or attached thereto in any desired manner. Mounted concentric with the hammer-arms are the hammer-levers $P^4$ and $Q^4$, provided with notched ends, as shown in Figs. 2 and 12. These hammer-levers are connected by the connecting-rods $P^5$ and $Q^5$ to the operating-levers F and G, as shown in Fig. 1. Pivotally connected with the hammer-levers are the hammer-dogs $P^6$ and $Q^6$. These dogs have a limited movement about their pivotal connection with the hammer-levers, such movement being obtained by the pins $P^7$ $Q^7$, attached to the hammer-levers working in enlarged holes in the hammer-dogs. (See Fig. 12.)

Located between the two hammer-levers is a safety-dog S, adapted to coöperate with both of said levers and to engage the notches S' in the face of the levers, so as to prevent them from being moved back before ringing the bell, after they have been started in motion. This safety-dog is illustrated in detail in Figs. 13, 14, and 15 and is pivotally connected to the base of the register-case and the holding-piece $S^2$. The dog works about its center as a pivot and is connected to a controlling-spring $S^3$ by means of a link $S^4$. This spring besides controlling this dog has other functions and aids in the control of the hammer-dogs $P^6$ $Q^6$. It will be noted that in this mechanism for ringing the two bells the mechanism is arranged so that a partial stroke of either is impossible and yet there is used only three springs, the safety-dog spring $S^3$ and the two bell-hammer springs $S^5$.

Each of the hammer-dogs $P^6$ $Q^6$ has a series of working faces adapted to perform a separate function. The faces $P^8$ $Q^8$ engage the hammer-arms, so as to lift the hammers when the hammer-levers are moved. The inclined faces $P^9$ $Q^9$ engage the stationary parts or posts $P^{10}$ $Q^{10}$, so as to move the hammer-dogs to release the hammer-arms. The faces $P^{11}$ $Q^{11}$ engage the safety-dog and release it simultaneously with the release of the hammer—that is, simultaneously with the disengagement of the faces $P^8$ $Q^8$ with the hammer-arms $P^2$ $Q^2$. The faces $P^{12}$ $Q^{12}$ engage the stationary parts $P^{13}$ $Q^{13}$ when the dogs are moved back to their initial position and move said dogs from their released to their operative position—that is, the position where they engage the hammer-arms $P^2$ $Q^2$. Said dogs also have the projections or faces $P^{14}$ $Q^{14}$, which are engaged by the safety-dog as the hammer dogs are moved forward, so as to insure the engagement of the hammer-dogs with the hammer-arms and prevent them from missing the hammer-arms, due to jarring or the like, during the first part of their forward movement. It will thus be seen that these hammer-dogs have no separate springs of their own and yet perform a series of functions necessitating their being held in differ relative positions at different times.

It will be seen that in this construction there is a bell-hammer and a hammer-lever for operating the bell-hammer oscillating around the same center and a hammer-dog carried by the hammer-lever adapted to lift the bell-hammer and release it at the end of the stroke, the release being a positive release at a predetermined point. There is also a safety-dog freely engaging the notched end of the hammer-lever when it is being moved forward, but which positively engages said lever if it is attempted to move it backward at any point between its initial and final positions. This safety-dog to be effective is released simultaneously with the ringing of the bell. This feature is necessary to the satisfactory operation of the device, for if the safety-dog is released an instant too soon the parts may be moved to their initial position without ringing the bell, and if the bell rings before the release of the safety-dog and the operator ceases moving the lever the mechanism does not return to its initial position.

A suitable indicating device is provided for indicating the class of fares registered. As shown in Fig. 1, the indicator is adapted for cash and transfer fares and consists of a plate T, adapted to be moved back and forth past an opening in the register-dial, so as to expose different indicating words or characters through said opening. This plate is mounted upon an arm T', which is pivotally connected to the post $T^2$. (See Fig. 2.) A second arm $T^3$ is pivoted at $P^{13}$ and is provided with notches $T^5$ and $T^6$. The arm T' has the pin or projection $T^7$, adapted to engage said notches. A pin $T^8$, connected with the hammer-lever $Q^4$, engages the arm T', so as to move it in one direction when the trip-register C is operated. In the present case the word "Transfer" is then exposed through the opening in the dial. A pin $T^9$ is connected with an arm $T^{10}$, fastened to the hammer-lever $P^4$, and engages said arm T', so as to move it to expose the word "Cash" through the opening in the dial. The movement of the arm T' is limited by the notches T⁵ and T⁶, the pin T⁷ entering said notches and being held therein. The arm T³ is provided with a spring which forces it toward the pin T⁷, thus preventing the indicating device from being moved except by the operation of the fare-register.

Associated with the register proper is a removable back U, containing mechanism operated by the movement of the rods V and W. (See Figs. 1 and 24.) These rods are connected to rods W', which extend along the sides of the car, and are provided at intervals with handles W². By moving the handle in one direction the registering mechanism which registers cash-fares is operated, while by moving it in the opposite direction the registering mechanism which registers transfers is operated. In Fig. 24 I have illustrated one form of this back. Mounted in this back are two levers U' U², to which the rods V and W are connected. These levers are mounted on pivots U³. There are also mounted on these same pivots the lever-arms U⁴ U⁵, which are provided with openings U⁶ for the pins or projections Y, which extend through the back of the register and by means of which the registering mechanism is operated. Connected with the levers U⁴ and U⁵ are the retracting-springs U⁷, the connection being made by the rods U⁸. The lever U' has a projection U⁹, which engages the lever U⁴ when moved in one direction, and another projection U¹⁰, which engages the lever U⁵ when moved in the opposite direction. It will thus be seen that the movement of the rod V in one direction moves the lever U⁵, so as to move one pin Y, while the movement of the rod in the other direction moves the lever U⁴, so as to move the other pin Y. The lever U² is provided with a projection U¹¹, which at one end engages the lever U⁵, so as to move it when moved in one direction, and which at the other end engages the lever U⁴, so as to move it when moved in the other direction, the retracting-springs bringing the parts back to their normal position. It will thus be seen that either lever U⁴ or U⁵, and hence either registering mechanism, can be operated by a movement of either of the rods V or W.

The use and operation of my invention are as follows: When it is desired, for example, to register a transfer-fare, the handle W² is moved toward the right. The operating-lever G is then moved forward. The rod E' and crank E² rotate the shaft of the permanent register E and register one fare. The rod E⁴, connected to the shaft of the permanent register, at the same time through the agency of the movable piece E⁵ and the pawl E⁶ and ratchet C' actuates the units-wheel of the trip-register C so as to move it forward one number. At the same time the blind C⁵ is moved up to cover the opening in the register-dial and conceal the numbers on the wheels of the trip-register. During this operation the motion of the operating-lever G is communicated to the hammer-lever by the rod Q⁵, and said hammer-lever is moved forward. The hammer-dog Q⁶, being attached to said lever, is moved forward and released from the post Q¹³. The projection or face Q¹⁴ is then engaged by the safety-dog S, so as to insure the engagement of the face Q⁸ with the hammer-arm Q². The hammer-arm is then moved so as to move the bell-hammer away from the bell. As the parts approach the end of the stroke the beveled face Q⁹ engages the stop Q¹⁰, and the hammer-dog is moved so as to release the arm Q². The spring S⁵ then returns the bell-hammer and rings the bell. Simultaneous with this release and the ringing of the bell occurs the release of the safety-dog. The parts are shown just prior to the release of the hammer-arm in Fig. 17. In Fig. 16 the parts are shown after the hammer-arm has been released and before the parts are returned to their initial position. When the bell has been rung, the handle is released by the operator, and the spring in the back of the register moves the parts to their initial position. During the forward movement of the parts the indicating device is moved to show the word "Transfer" through the opening in the dial, if it was not previously in this position. If it is desired to register a cash-fare, the handle is moved in the opposite direction and the other mechanism operated in the manner hereinbefore described. When it is desired to reset the trip-registers at the end of the trip, the shaft I is rotated. The rotation of this shaft rotates the cam I², and the engagement of the beveled face of the cam-lever I' with the beveled face of the notch I⁴ lifts said cam-lever. This movement of the cam-lever rocks the shaft C¹⁶, thus moving the arm C¹⁵ and disconnecting the tens-wheel from the units-wheel by disconnecting the pinion C¹⁴ from the gear C¹³, thus allowing the independent resetting of the two wheels. The projection I⁵ of the cam-lever then falls into the notch I⁶ and prevents the backward movement of the parts, and hence the resetting must be completed. The rocking of the shaft C¹⁶ causes the bent arm N to be moved upwardly (see Fig. 6) so as to move the blind C⁵ in front of the opening in the dial, thus concealing the figures of the trip-register during the operation of resetting. While the tens-wheel is being disconnected from the units-wheel, the projection I¹¹ on the resetting-lever engages the face of the opening or notch I¹⁴, (see Fig. 8,) and said lever is rocked about its pivotal point, so as to move the projection I⁸ beyond the face of the resetting-shaft. As the resetting-shaft is rotated this projection I⁸ comes into contact with the projections I⁹ and I¹⁰ on the numeral-wheels, thus moving the numeral-wheels with it back to the zero-point. These wheels are prevented from going past the zero-point by the projections $C^{23}$ and $C^{24}$ (see Fig. 10) engaging the engaging part $C^{22}$. If the hundreds-wing has been used, it is released when the cam-lever is first moved by the cam, for said cam-lever raises the holding-piece $J^8$ so as to disengage the projection $J^{11}$ from the arm $J'$ and allow said hundreds-wing to be moved back to its inoperative position by the associated spring. During this movement of the resetting mechanism the cam-lever rides around on the periphery of the cam-wheel $I^2$ and is kept in its lifted position. When the numeral-wheels have been returned to zero, the projection $I^5$ of the cam-lever comes opposite the notch $I^4$ and is forced therein by the spring $I^{15}$. The tens-wheel is then again connected with the units-wheel. The part $I^{13}$, connected with the cam-lever, engages the projection $1^{12}$ on the resetting-lever and rocks said lever about its pivotal point so as to withdraw the projection $I^8$ into the resetting-shaft. As hereinbefore explained, if the numeral-wheels of the trip-register are at zero the projection $I^8$ will not engage the projections $I^9$ and $1^{10}$, because it is not projected from the shaft until after it passes them, due to the enlargement of the opening or notch $I^{14}$. The lifting of the cam-lever moves the locking device M, so that neither of the operating-levers F or G can be operated while the trip-registers are being reset. I have described the resetting of one of the trip-registers; but the resetting-shaft passes through both registers and resets them both simultaneously, the operation being the same in each register.

It will be noted that the resetting-lever has two projections, one the actuating part for the lever adapted to move it to its operative position and the other the engaging part to engage the numeral-wheels or some part associated therewith, so as to return them to zero. The position of the engaging part is controlled by varying the position of the actuating part. It will further be noted that there are means associated with this resetting mechanism for retarding the operative effect of the engaging part, so that if the wheels are at zero the useless operation of moving them entirely around will be obviated.

In the present case the shutter mechanism and the bell mechanism are not claimed, as they are made the subject-matter of two divisional applications divided from the present case. Neither is the hundreds' indicator mechanism claimed herein, as such mechanism is the subject-matter of a divisional application divided from this case.

The divisional application for the shutter mechanism was filed April 23, 1903, Serial No. 153,905, that for the bell mechanism was filed April 23, 1903, Serial No. 153,904, and that for the hundreds' indicator was filed October 10, 1903, Serial No. 176,463.

I claim—

1. The combination in a registering device of a resetting device, comprising a recessed shaft, a resetting-lever mounted in said recessed shaft, and a controlling device for controlling the position of said lever when the shaft is rotated.

2. The combination in a registering device of a resetting device, comprising a recessed shaft, a resetting-lever mounted therein and provided with two projecting parts, one the actuating part for the lever and the other the engaging part to engage the registering mechanism to reset it, the device arranged so that the engaging part is controlled by varying the position of the actuating part, and means for varying the position of said actuating part when it is desired to reset the mechanism.

3. The combination in a registering mechanism of a resetting device, comprising a recessed shaft, a resetting-lever mounted in said recessed shaft and provided with a part adapted to be projected beyond the face of the shaft so as to engage the registering mechanism, and a varying device for controlling the position of said lever when the shaft is rotated.

4. The combination in a registering device of a resetting device, comprising a recessed shaft, a resetting-lever mounted in said recessed shaft, a controlling device for controlling the position of said lever, and means for retarding the operation of the controlling device so as to delay the movement of said lever in a predetermined manner.

5. A resetting device for registering mechanisms, comprising a rotatable recessed shaft, a resetting-lever mounted therein and provided with two projecting parts, one adapted to engage the registering mechanism when the shaft is rotated and reset it, the other adapted to engage an actuating part when the shaft is rotated so as to move the shaft and project beyond the face of the shaft the part which engages the registering mechanism.

6. The combination in a registering mechanism of a resetting device, comprising a rotatable recessed shaft, a resetting-lever mounted therein and provided with a part adapted to be projected beyond the shaft so as to engage the registering mechanism and reset it, a cam on said shaft, a lever associated with said cam, a blind connected with said lever so as to be actuated thereby to cover the exposed part of the registering mechanism while it is being reset.

7. A resetting device for registering mechanisms, comprising a rotatable shaft, a lever pivotally connected thereto, a controlling device for controlling the position of said lever, comprising two separate devices, one adapted to move the lever to its operative position and the other adapted to move it to its inoperative position.

8. The combination in a fare-register, comprising a permanent and trip register, of a resetting device for the trip-register, comprising a rotatable shaft, a cam on said shaft, a cam-lever engaging said cam and adapted to be lifted when the shaft is turned, said shaft attached to the connecting mechanism between the tens and units wheels so as to disconnect said wheels when moved, and also connected with a blind so as to move said blind to conceal the figures of the trip-register while being reset.

9. A register, comprising two sets of registering mechanism located in the same casing, each set comprising a permanent register, a trip-register and an alarm mechanism, placed in alinement, the two sets located side by side, an operating mechanism for said registering mechanisms, a connection between the operating mechanism and the permanent register, a connection between the permanent register and the trip-register, and an independent connection from the operating mechanism to the alarm mechanism, comprising connecting-rods connected to the operating mechanism and located between the two sets of registering mechanism and connected with the alarm mechanism.

10. A register comprising a casing containing a registering mechanism, a back attached to said casing, an intermediate chamber, a separate casing within said chamber, and a bell within said latter casing.

11. A register, containing two sets of registering mechanism located side by side, each comprising a permanent register, a trip-register and an alarm mechanism, the permanent and trip registers having substantially parallel shafts and the alarm mechanisms mounted on shafts substantially at right angles to the shafts of the permanent and trip registers.

12. The combination in a register of two sets of registering mechanism, each comprising a permanent register, a trip-register and an alarm device, with a space between them, the trip-registers actuated through the permanent registers and a separate actuating device for the alarm device the connections from the actuating mechanism to said register and alarm devices located in said space.

13. The combination in a registering device of a resetting device, comprising a shaft having a longitudinal recess, a resetting-lever in said recess, and an automatic controlling device for controlling its position when the shaft is rotated.

14. The combination in a registering device of a resetting device, comprising a shaft, a resetting-lever extending longitudinally along a portion of said shaft, and a controlling device for controlling the position of said lever.

15. The combination with a registering device of a casing therefor, a resetting device for the registering device, comprising a shaft having one end projecting through said casing, a resetting-lever within the casing and mounted upon said shaft so as to be inaccessible from the exterior of the casing, and an engaging device within the casing which engages said resetting-lever when the shaft is turned so as to move it to its operative position.

16. The combination in a registering device of a resetting device comprising a recessed shaft, a resetting-lever mounted in said recessed shaft and pivotally connected therewith between its ends, an engaging device on each end of the lever, one engaging device adapted to engage the registering mechanism, and the other adapted to engage a controlling device for the lever.

17. A register comprising two sets of registering mechanism, placed side by side and separated by a space, interlocking actuating parts for said mechanism located at the end of said space, an alarm mechanism located at the other end of said space, and a connecting device between said actuating parts and said alarm mechanism.

ARTHUR H. WOODWARD.

Witnesses:
DONALD M. CARTER,
WILLIAM H. BROWN.